United States Patent [19]

Yoshimura et al.

[11] Patent Number: 4,528,304

[45] Date of Patent: Jul. 9, 1985

[54] POLYAMIDE RESIN COMPOSITION

[75] Inventors: Tokuo Yoshimura, Machida; Kunio Hagiwara, Yokohama; Akira Aiba, Fujisawa, all of Japan

[73] Assignee: Nippon Steel Chemical Co., Ltd., Tokyo, Japan

[21] Appl. No.: 556,864

[22] Filed: Dec. 1, 1983

[30] Foreign Application Priority Data

Jun. 19, 1983 [JP] Japan ............................ 58-109493

[51] Int. Cl.$^3$ .............................................. C08K 3/34
[52] U.S. Cl. .................... 523/216; 524/443; 524/444; 524/599; 524/606
[58] Field of Search ............... 524/443, 444, 599, 606; 523/216

[56] References Cited

U.S. PATENT DOCUMENTS 4,124,730 11/1978 Albert et al. .................... 427/220
4,363,894 12/1982 Locatelli ........................ 524/494

FOREIGN PATENT DOCUMENTS 5751155  9/1980  Japan .
5852335  9/1980  Japan .
5790036  11/1980  Japan .
5852341  9/1981  Japan .

Primary Examiner—Lewis T. Jacobs
Attorney, Agent, or Firm—Armstrong, Nikaido, Marmelstein & Kubovcik

[57] ABSTRACT

A polyamide resin composition which comprises 20 to 80 wt % of polyamide resin and 80 to 20 wt % of inorganic fibers, 85 to 15 wt % of said inorganic fiber being glass fiber and remaining 15 to 85 wt % being ground mineral fiber having an aspect ratio of 5 to 100. The composition has high strength and high modulus of elasticity and is suitable for molding. The composition provides moldings having good surfaces.

5 Claims, No Drawings

POLYAMIDE RESIN COMPOSITION

BACKGROUND OF THE INVENTION

1. Field of the Invention

The present invention relates to a thermoplastic resin composition containing inorganic fibers as reinforcement. More particularly, it relates to a polyamide resin composition having high strength and high modulus of elasticity.

2. Description of the Prior Art

As the plastics have recently begun to be used for making machine elements such as gears and structures, there has arisen a demand for plastics materials having high strength and high modulus of elasticity. One way of meeting such a demand is incorporating thermoplastic resins with glass fiber, carbon fiber, potassium titanate whisker, and the like, individually or in combination with one another. It is known that when glass fiber is combined with carbon fiber, talc or calcium carbonate in the form of powder or flake, or potassium titanate whisker, the resulting resin composition has very high strength and high modulus of elasticity. Such combination of reinforcements has disadvantages. That is, carbon fiber and potassium titanate whisker are expensive, and talc and calcium carbonate in the form of powder or flake impede reinforcement by glass fiber. Moreover glass fiber deteriorates the surface of moldings when used in large quantities.

On the other hand, there is another known reinforcement for thermoplastic resins. It is ground mineral fiber having comparatively short length and controlled range of aspect ratios (ratio of length to diameter of a fiber). Typical ground mineral fiber is shown in the following U.S. Pat. No. 4,124,730, and Japanese Patent Publication (unexamined) Nos. 51155/82, 90036/82, 52335/83 and 52341/83. The thermoplastic resin compositions disclosed in these patents are not necessary able to meet the demand for high strength and high modulus of elasticity.

In order to overcome the above-mentioned disadvantages and to produce an inexpensive resin composition which has high strength and high modulus of elasticity and provides good surfaces of moldings, the present inventors carried out a series of researches. As the result, it was found that a polyamide resin filled with glass fiber and ground mineral fiber having an aspect ratio of 5 to 100 in certain quantities is more improved in strength as compared with the one filled with glass fiber alone. The combination of the two reinforcements saves the comparatively expensive glass fiber and polyamide resin. Moreover, the resin composition of this invention provides good surfaces of moldings. The present invention was completed based on these findings.

SUMMARY OF THE INVENTION

Accordingly, it is an object of this invention to provide a new polyamide resin composition incorporated with glass fiber and ground mineral fiber. This object is achieved by a polyamide resin composition composed mainly of 20 to 80 wt% of polyamide resin and 80 to 20 wt% of inorganic fibers, 85 to 15 wt% of which is accounted for by glass fiber and remaining 15 to 85 wt% of which, by ground mineral fiber having an aspect ratio of 5 to 100.

It is another object of this invention to provide a polyamide resin composition incorporated with ground mineral fiber surface-treated with a coupling agent.

It is further another object of this invention to provide a polyamide resin composition which has high strength and high modulus of elasticity and provides moldings having good surfaces.

DETAILED DESCRIPTION OF THE INVENTION

The polyamide resin used in this invention includes polymers and copolymers obtained through condensation reaction of dicarboxylic acid and diamine or aminocarboxylic acids, or polymerization reaction of lactoms. Examples of suitable dicarboxylic acids include adipic acid, sebacic acid, succinic acid, p-phenylenediacetic acid and terephthalic acid. Examples of suitable diamines include hexamethylenediamine, octamethylenediamine, m-xylylenediamine, bis(p-aminocyclohexyl)methane, 1,4-bis(3-aminopropoxy)cyclohexane and transhexahydro-p-phenyenediamine. Examples of suitable aminocarboxylic acids and lactams include ω-aminocaproic acid, ω-aminoundecanoic acid, p-aminobenzoic acid, 4-aminophenyl-4-carboxyphenyl ether, ε-caprolactam, ω-laurolactam and α-pyrrolidone. These polyamide resins may be used individually or in combination with one another. Polyamide resins having a low softening point are preferable. Examples of such polyamide resins include nylon 6, nylon 66, nylon 6/10, nylon 11, and nylon 12.

The glass fiber used in this invention is mainly composed of CaO 10 to 20 wt%, $SiO_2$ 50 to 70 wt%, and $Al_2O_3$ 2 to 15 wt%. The type of the glass fiber is not specifically limited; any glass fiber in the form of roving or chopped strand that can be used as reinforcement for resins is acceptable. Glass wool of short fibers is not preferred. The preferred glass fiber has an average fiber length of 1 to 10 mm, an average fiber diameter of 5 to 20 microns, preferably 10 to 15 microns, and an aspect ratio of 50 and up. The glass fibers are broken when mixed with a polyamide resin, and their averaga length in the resin composition is 0.2 to 2 mm, preferably 0.3 to 1 mm.

The mineral fiber to be incorporated, in combination with the glass fiber, into the polyamide resin includes rock wool, ceramic fiber, silica fiber, and alumina fiber.

Rock wool, which is also called slag wool, is composed mainly of CaO 20 to 45 wt%, $SiO_2$ 30 to 50 wt%, and $Al_2O_3$ 5 to 20 wt%, and contains MgO and others as minor components. Rock wool is produced by melting natural rocks such as basalt, andesite, and diabase, or blast furnace slag obtained as a by-product in iron manufacture, and then fiberizing the resulting melt. It has the fiber length of several millimeters to several centimeters and contains 30 to 40% of particles.

The mineral fiber is ground so that individual ground fibers have an aspect ratio of 5 to 100. The grinding is accomplished by using a rotary disc attritor, compression attritor, or opposed-roll type attritor. After grinding, the ground mineral fiber may preferably be separated into fibers and particles by using an air classifier.

The ground mineral fiber, e.g., ground rock wool, which is also called processed mineral fiber, should have an average fiber length of 20 to 500 microns, an average fiber diameter of 2 to 10 microns, and an aspect ratio of 5 to 100. Preferably, more than 70% of the ground fiber has an average fiber length of 100 to 200 microns and an average fiber diameter of 3 to 5 microns.

As in glass fiber, the ground mineral fibers may also be broken when mixed with a polyamide resin, but to a less extent than glass fiber because they are previously ground. What is important is the length and aspect ratio of the ground fiber contained in the resin composition. The average fiber length should be 20 to 500 microns, and preferably 50 to 200 microns, with a minimum of variation. The average aspect ratio should be 5 to 100, and preferably 10 to 60.

The glass fiber and ground mineral fiber may be used as such, but both or either of them may be surface-treated with a coupling agent to increase the mechanical strength of the polyamide composition and improve the surface of the resulting moldings.

The coupling agent used for this purpose includes silane coupling agents, titanate coupling agents and aluminum coupling agents.

Examples of the silane coupling agents include γ-methacryloxypropyltrimethoxysilane, γ-aminopropyltrimethoxysilane, N-(β-aminoethyl)-γ-aminopropyltrimethoxysilane, β-(3,4-epoxycyclohexyl)ethyl-trimethoxysilane, γ-glycidoxypropyltrimethoxysilane, vinyltriethyoxysilane, vinyltris(2-methoxyethoxy)silane, γ-mercaptopropyltrimethoxysilane, and other alkoxysilanes and their corresponding hydroxysilanes.

Examples of the titanate coupling agents include isopropyltriisostearoyl titanate and isopropyltridodecylbenzenesulfonyl titanate.

Examples of the aluminum coupling agents include acetoalkoxyaluminum diisopropylate.

The surface treatement of glass fiber and ground mineral fiber may be accomplished in any way. In one way, the fiber is sprayed with a coupling agent in a blender equipped with a spraying apparatus. In another way, the fiber is dipped in a solution of coupling agent dissolved in water or organic solvent, followed by drying. In further another way, the fiber is dryblended with a coupling agent at room temperature to 250° C. The coupling agent is used in an amount of 0.01 to 10 parts by weight, and preferably 0.1 to 5 parts by weight for 100 parts by weight of the fiber. The coupling agent may be incorporated into the polyamide resin by mixing together a polyamide resin, glass fiber, and ground mineral fiber all at once.

According to this invention, the blending ratio of polyamide resin to inorganic fiber is 20–80 wt% to 80–20 wt%, preferably 30–70 wt% to 70–30 wt%, more preferably 30–50 wt% to 70–50 wt%. If the blending ratio of inorganic fiber is greater than 80 wt%, the resulting composition is low in strength, and if the blending ratio is lower than 20 wt%, the reinforcing effect is not produced sufficiently.

The inorganic fiber is a combination of glass fiber and ground mineral fiber. If glass fiber alone is used, the resulting resin composition has high strength but the moldings produced therefrom does not have good surfaces. On the other hand, if ground mineral fiber alone is used, the resulting resin composition is insufficient in strength. The mixing ratio of glass fiber to ground mineral fiber should be 15–85 wt% to 85–15 wt%, and preferably 30–70 wt% to 70–30 wt%. The content of glass fiber and ground mineral fiber in the resin composition should be 20–50 wt% and 10–50 wt%, respectively, and the sum of the two should be 30 to 70 wt%.

The polyamide resin containing glass fiber and ground mineral fiber may be produced in the usual way by using a blender or the like. The polyamide resin composition thus produced may be formed into any desired shape by ordinary extrusion molding or injection molding. The polyamide resin composition may be incorporated further with a flame retardant, pigment, plasticizer, stabilizer, antioxidant, UV absorber, cross-linking agent, and other additives which are commonly used for polyamide resins, and with a dispersant for inorganic fibrous reinforcement, an auxiliary agent to improve the adhesion between inorganic fiber and polyamide resin, an inorganic filler, and a fibrous reinforcement.

The polyamide resin composition of this invention composed of a polyamide resin, glass fiber, and ground mineral fiber is improved in strength as compared with a polyamide resin composition incorporated with glass fiber alone. Additionally, the polyamide resin composition of this invention saves glass fiber and polyamide resin, and moreover it provides moldings having improved surfaces.

The invention is described in more detail with reference to the following examples.

EXAMPLE 1

Polyamide resin compositions were prepared by blending nylon 6 with glass fiber and ground mineral fiber in the ratio shown in Table 1 and mixing the blend by using an extruder. The particulars of the components are given below.

Nylon 6: a product of Ube Industries, Ltd.

Glass fiber: having an average fiber length of 3 mm, an average fiber diameter of 13 microns, and an aspect ratio of 230.

Ground mineral fiber: ground rock wool "S-FIBER FF", blast furnace slag fiber of Nippon Steel Chemical Co., Ltd., having an average fiber length of 120 microns, an average fiber diameter of 4 microns, and an aspect ratio of 20 to 40, and containing less than 1 wt% of particles larger than 105 microns by diameter.

The resulting polyamide resin compositions were made into test pieces by injection molding, and their tensile strength (JIS K6871), tensile elongation (JIS K6871), flexural strength (ASTM D-790), flexural modulus, and Izod impact strength with a ¼" notch (ASTM D256) were measured. Also, the surfaces of the test pieces were evaluated by rating in four grades. The results are shown in Table 1.

TABLE 1

| Polyamide resin composition | | | | | | | | | | |
| --- | --- | --- | --- | --- | --- | --- | --- | --- | --- | --- |
| Glass fiber (wt %) | 0 | 0 | 0 | 0 | 20 | 20 | 20 | 20 | 30 | 30 |
| Ground rock wool (wt %) | 0 | 10 | 30 | 50 | 0 | 10 | 30 | 50 | 0 | 10 |
| Nylon 6 (wt %) | 100 | 90 | 70 | 50 | 80 | 70 | 50 | 30 | 70 | 60 |
| Tensile strength (kg/cm$^2$) | 750 | 730 | 720 | 750 | 1340 | 1480 | 1580 | 1380 | 1650 | 1810 |
| Elongation (%) | 15.0 | 14.5 | 3.2 | 1.9 | 6.5 | 4.6 | 3.8 | 2.5 | 6.0 | 5.1 |
| Flexural strength (kg/cm$^2$) | 1100 | 1230 | 1290 | 1200 | 2110 | 2340 | 2410 | 2290 | 2300 | 2780 |
| Flexural modulus (kg/cm$^2$ × 10$^2$) | 600 | 380 | 610 | 940 | 680 | 820 | 1160 | 1860 | 770 | 1120 |
| Izod impact strength (kg-cm/cm) | 7 | 3.2 | 2.5 | 3.3 | 6.9 | 7.2 | 9.2 | 7.7 | 10.0 | 11.2 |
| Surface of test piece | A | A | A | B | A | A | B | C | A | B |
| Glass fiber (wt %) | 30 | 30 | 30 | 40 | 40 | 40 | 40 | 50 | 50 | 50 |

TABLE 1-continued

| Polyamide resin composition | | | | | | | | | | |
|---|---|---|---|---|---|---|---|---|---|---|
| Ground rock wool (wt %) | 20 | 30 | 40 | 0 | 10 | 20 | 30 | 0 | 10 | 20 |
| Nylon 6 (wt %) | 50 | 40 | 30 | 60 | 50 | 40 | 30 | 50 | 40 | 30 |
| Tensile strength (kg/cm$^2$) | 1930 | 1910 | 1710 | 1980 | 2120 | 2120 | 1980 | 2310 | 2370 | 2190 |
| Elongation (%) | 4.4 | 3.9 | 3.1 | 5.0 | 4.6 | 4.0 | 3.4 | 3.5 | 3.4 | 3.1 |
| Flexural strength (kg/cm$^2$) | 2940 | 2920 | 2740 | 2900 | 3230 | 3280 | 3120 | 3420 | 3560 | 3450 |
| Flexural modulus (kg/cm$^2 \times 10^2$) | 1310 | 1590 | 1980 | 1190 | 1410 | 1670 | 1950 | 1350 | 1790 | 2050 |
| Izod impact strength (kg-cm/cm) | 12.5 | 12.0 | 9.9 | 14.0 | 15.1 | 14.5 | 12.0 | 16.9 | 14.9 | 14.1 |
| Surface of test piece | B | B | C | B | B | B | C | B | B | D |

Note:
A: Excellent, B: Good, C: Fair, D: Poor

EXAMPLE 2

Polyamide resin compositions were prepared in the same manner as in Example 1 except that nylon 6 was replaced by nylon 66 (a product of Ube Industries, Ltd.). The same evaluation tests as in Example 1 were carried out. The results are shown in Table 2.

TABLE 2

| Polyamide resin composition | | | | | | | | | | |
|---|---|---|---|---|---|---|---|---|---|---|
| Glass fiber (wt %) | 0 | 0 | 0 | 30 | 30 | 30 | 30 | 40 | 40 | 40 |
| Ground rock wool (wt %) | 0 | 30 | 50 | 0 | 10 | 20 | 30 | 0 | 10 | 20 |
| Nylon 66 (wt %) | 100 | 70 | 50 | 70 | 60 | 50 | 40 | 60 | 50 | 40 |
| Tensile strength (kg/cm$^2$) | 780 | 710 | 690 | 1680 | 1760 | 1780 | 1610 | 1970 | 2020 | 1790 |
| Elongation (%) | 6.0 | 4.1 | 2.0 | 5.0 | 4.8 | 4.2 | 3.3 | 5.0 | 4.3 | 3.4 |
| Flexural strength (kg/cm$^2$) | 1100 | 1290 | 1120 | 2480 | 2660 | 2730 | 2650 | 2910 | 3100 | 2930 |
| Flexural modulus (kg/cm$^2 \times 10^2$) | 290 | 530 | 830 | 850 | 1040 | 1200 | 1410 | 1100 | 1300 | 1510 |
| Izod impact strength (kg-cm/cm) | 3 | 2.8 | 2.8 | 8.7 | 9.4 | 10.5 | 10.1 | 12.2 | 13.6 | 12.2 |
| Surface of test piece | A | A | B | A | B | B | B | B | B | B |

COMPARATIVE EXAMPLE 1

Resin compositions were prepared in the same manner as in Example 1 and 2 except that nylon 6 was replaced by polyethylene terephthalate. The same evaluation tests as in Example 1 were carried out. The results are shown in Table 3.

TABLE 3

| Resin composition | | | | | | | |
|---|---|---|---|---|---|---|---|
| Glass fiber (wt %) | 30 | 30 | 30 | 30 | 40 | 40 | 40 |
| Ground rock wool (wt %) | 0 | 10 | 20 | 30 | 0 | 10 | 20 |
| Polyethylene terephthalate (wt %) | 70 | 60 | 50 | 40 | 60 | 50 | 40 |
| Tensile strength (kg/cm$^2$) | 1610 | 1590 | 1540 | 1450 | 1860 | 1730 | 1620 |
| Elongation (%) | 4.4 | 3.8 | 3.3 | 2.8 | 4.1 | 3.4 | 3.0 |
| Flexural strength (kg/cm$^2$) | 2550 | 2640 | 2610 | 2440 | 3040 | 2940 | 2820 |
| Flexural modulus (kg/cm$^2 \times 10^2$) | 960 | 1120 | 1340 | 1790 | 1460 | 1460 | 1780 |
| Izod impact strength (kg-cm/cm) | 7.6 | 7.2 | 7.2 | 6.4 | 8.7 | 8.0 | 7.6 |

EXAMPLE 3

Polyamide resin compositions of nylon 66 were prepared in the same manner as in Example 2 except that ground rock wool was surface-treated with various kinds of coupling agents as shown in Table 4. Each coupling agent is used in an amount of 0.7 parts by weight for 100 parts by weight of the ground rock wool. The same evaluation tests as in Example 2 were carried out. The results are shown in Table 4.

TABLE 4

| Polyamide resin composition | | | | | | | | | | | |
|---|---|---|---|---|---|---|---|---|---|---|---|
| Nylon 66 (wt %) | 50 | 50 | 50 | 50 | 40 | 40 | 40 | 40 | 30 | 30 | 30 |
| Glass fiber (wt %) | 30 | 30 | 30 | 30 | 30 | 30 | 30 | 30 | 30 | 30 | 30 |
| Ground rock wool (wt %) | 20 | 20 | 20 | 20 | 30 | 30 | 30 | 30 | 40 | 40 | 40 |
| Coupling agent | none | *1 | *2 | *3 | none | *1 | *2 | *3 | none | *1 | *2 |
| Tensile strength (kg/cm$^2$) | 1730 | 1800 | 1840 | 1800 | 1560 | 1670 | 1650 | 1660 | 1510 | 1640 | 1500 |
| Elongation (%) | 4.3 | 4.5 | 4.6 | 4.4 | 3.3 | 3.5 | 3.5 | 3.3 | 2.6 | 2.9 | 2.7 |
| Flexural strength (kg/cm$^2$) | 2640 | 2830 | 2740 | 2730 | 2560 | 2780 | 2870 | 2850 | 2710 | 2960 | 2950 |
| Flexural modulus (kg/cm$^2 \times 10^2$) | 1100 | 1100 | 1100 | 1100 | 1200 | 1200 | 1300 | 1300 | 1600 | 1600 | 1600 |
| Izod impact strength (kg-cm/cm) | 8.8 | 8.9 | 10 | 9.2 | 9.7 | 9.8 | 11 | 9.9 | 7.6 | 8.1 | 8.2 |

Note:
*1: γ-Aminopropyltriethoxysilane
*2: γ-(Epoxymethoxy) propyltrimethoxysilane
*3: Methacrylic-type silane coupling agent

EXAMPLE 4

Polyamide resin compositions of nylon 6 were prepared in the same manner as in Example 3. The same evaluation tests as in Example 3 were carried out. The results are shown in Table 5.

TABLE 5

| Polyamide resin composition | | | | | | | | |
|---|---|---|---|---|---|---|---|---|
| Nylon 6 (wt %) | 50 | 50 | 50 | 50 | 30 | 30 | 30 | 30 |
| Glass fiber (wt %) | 30 | 30 | 30 | 30 | 30 | 30 | 30 | 30 |
| Ground rock wool (wt %) | 20 | 20 | 20 | 20 | 40 | 40 | 40 | 40 |

TABLE 5-continued

| Polyamide resin composition | | | | | | | | |
|---|---|---|---|---|---|---|---|---|
| Coupling agent | none | *1 | *2 | *3 | none | *1 | *2 | *3 |
| Tensile strength (kg/cm²) | 1600 | 1690 | 1710 | 1640 | 1640 | 1780 | 1690 | 1740 |
| Elongation (%) | 4.3 | 4.7 | 4.5 | 3.4 | 3.4 | 3.5 | 3.3 | 3.4 |
| Flexural strength (kg/cm²) | 2560 | 2720 | 2640 | 2650 | 2750 | 3080 | 3070 | 2920 |
| Flexural modulus (kg/cm² × 10²) | 1100 | 1100 | 1100 | 1100 | 1500 | 1600 | 1700 | 1600 |
| Izod impact strength (kg-cm/cm) | 10 | 11 | 11 | 11 | 9.3 | 9.6 | 10 | 10 |

Note:
*1: γ-Aminopropyltriethoxysilane
*2: γ-(Epoxymethoxy)propyltrimethoxysilane
*3: Methacrylic-type silane coupling agent

EXAMPLE 5

Polyamide resin compositions as shown in Table 6 were prepared from nylon 6 (as used in Example 4), surface-treated glass fiber (03MA416, a product of Asahi FiberGlass), and ground rock wool surface-treated with a silane coupling agent. The same evaluation tests as in Example 4 were carried out. The results are shown in Table 6.

TABLE 6

| Polyamide resin composition | | | |
|---|---|---|---|
| Nylon 6 (wt %) | 70 | 50 | 30 |
| Glass fiber (wt %) | 20 | 30 | 50 |
| Ground rock wool (wt %) | 10 | 20 | 20 |
| Tensile strength (kg/cm²) | 1483 | 1709 | 1784 |
| Elongation (%) | 4.9 | 4.3 | 3.8 |
| Flexural strength (kg/cm²) | 2296 | 2689 | 2980 |
| Flexural modulus (kg/cm² × 10²) | 769.3 | 1171 | 1866 |
| Izod impact strength (kg-cm/cm) | 7.6 | 10.7 | 9.7 |

What is claimed is:

1. A polyamide resin composition consisting essentially of 30 to 70 weight percent polyamide resin, 20 to 50 weight percent of glass fiber and 10 to 50 weight percent of ground rock wool, said ground rock wool having an aspect ratio of between 50 and 100.

2. A polyamide resin composition as recited in claim 1, wherein the ground rock wool is surface-treated with a coupling agent.

3. A polyamide resin composition as recited in claim 1 or claim 2, wherein the polyamide resin is nylon 6.

4. A polyamide resin composition as recited in claim 1 or claim 2, wherein the polyamide resin is nylon 66.

5. A polyamide resin composition as recited in claim 1, wherein the ground rock wool has an average fiber length of 20 to 500 microns and an average fiber diameter of 2 to 10 microns.

* * * * *

UNITED STATES PATENT AND TRADEMARK OFFICE
CERTIFICATE OF CORRECTION

PATENT NO. : 4,528,304
DATED : July 9, 1985
INVENTOR(S) : TOKUO YOSHIMURA ET AL

It is certified that error appears in the above-identified patent and that said Letters Patent is hereby corrected as shown below:

Claim 1, line 5, change "between 50 and 100" to --- between 5 and 100 ---.

Signed and Sealed this

Fifth Day of November 1985

[SEAL]

Attest:

Attesting Officer

DONALD J. QUIGG

Commissioner of Patents and Trademarks